US010341488B2

(12) United States Patent
Munns et al.

(10) Patent No.: US 10,341,488 B2
(45) Date of Patent: Jul. 2, 2019

(54) METHODS AND SYSTEMS FOR MANAGING SIMULATED REAL-TIME CONVERSATIONS

(71) Applicant: Perfect Pitch Technology, LLC, Lehi, UT (US)

(72) Inventors: Jacob Munns, Salt Lake City, UT (US); Berton Earnshaw, Cedar Hills, UT (US); Darren Rosenlund, Pleasant Grove, UT (US)

(73) Assignee: PERFECT PITCH TECHNOLOGY, LLC, Lehi, UT (US)

(*) Notice: Subject to any disclaimer, the term of this patent is extended or adjusted under 35 U.S.C. 154(b) by 36 days.

(21) Appl. No.: 14/829,436

(22) Filed: Aug. 18, 2015

(65) Prior Publication Data

US 2015/0358465 A1 Dec. 10, 2015

Related U.S. Application Data

(63) Continuation of application No. 13/266,009, filed as application No. PCT/US2011/028816 on Mar. 17, 2011, now Pat. No. 9,112,971.

(60) Provisional application No. 61/315,011, filed on Mar. 18, 2010.

(51) Int. Cl.
*H04M 3/51* (2006.01)

(52) U.S. Cl.
CPC ....... *H04M 3/5166* (2013.01); *H04M 3/5175* (2013.01); *H04M 3/5183* (2013.01); *H04M 2203/306* (2013.01)

(58) Field of Classification Search
CPC combination set(s) only.
See application file for complete search history.

(56) References Cited

U.S. PATENT DOCUMENTS

| | | | |
|---|---|---|---|
| 4,697,282 A | 9/1987 | Winter et al. | |
| 5,327,486 A | 7/1994 | Wolff et al. | |
| 5,511,112 A * | 4/1996 | Szlam | H04M 3/36 379/162 |
| 5,544,232 A | 8/1996 | Baker et al. | |
| 5,559,867 A | 9/1996 | Langsenkamp et al. | |
| 5,561,711 A | 10/1996 | Muller | |
| 5,619,554 A | 4/1997 | Hogan et al. | |
| 6,104,790 A | 8/2000 | Narayanaswami | |
| 6,356,634 B1 | 3/2002 | Noble, Jr. | |
| 6,643,362 B2 | 11/2003 | Hogan et al. | |
| 6,748,095 B1 | 6/2004 | Goss | |
| 6,757,362 B1 * | 6/2004 | Cooper | H04M 3/527 379/88.01 |
| 7,043,193 B1 * | 5/2006 | Vashi | G09B 7/00 434/323 |

(Continued)

*Primary Examiner* — Joseph T Phan
(74) *Attorney, Agent, or Firm* — Loza & Loza, LLP; Tyler J. Barrett

(57) ABSTRACT

Methods and systems for managing real-time conversations include are disclosed. In one or more examples, an audio response selected from among a plurality of selectable audio responses associated with a call script may be communicated to a caller. The call script can include a number of segments, and the segments may be associated with the selectable audio responses. In addition to the selectable audio response being communicated to the caller, background sound may also be mixed with the communicated audio response and communicated to the caller. Other aspects, embodiments, and features are also included.

7 Claims, 4 Drawing Sheets

(56) References Cited

U.S. PATENT DOCUMENTS

| | | | |
|---|---|---|---|
| 7,292,543 B2* | 11/2007 | Li | H04M 3/56 |
| | | | 370/260 |
| 7,483,520 B2 | 1/2009 | Han et al. | |
| 7,640,510 B2 | 12/2009 | Sirstins et al. | |
| 7,653,195 B2 | 1/2010 | Shimpi et al. | |
| 7,933,387 B1 | 4/2011 | Baker, IV | |
| 8,503,619 B2 | 8/2013 | Baker | |
| 2002/0048030 A1* | 4/2002 | Soscia | G11B 7/0033 |
| | | | 358/1.9 |
| 2006/0188087 A1 | 8/2006 | Kortum et al. | |
| 2010/0168886 A1 | 7/2010 | Sirstins et al. | |

* cited by examiner

METHODS AND SYSTEMS FOR MANAGING SIMULATED REAL-TIME CONVERSATIONS

PRIORITY CLAIM

The present Application for Patent is a continuation application from U.S. application Ser. No. 13/266,009 filed Oct. 24, 2011, which is a national stage entry claiming the benefit of PCT Application No. PCT/US2011/028816 filed on Mar. 17, 2011, which claims the benefit of U.S. Provisional Application No. 61/315,011 filed Mar. 18, 2010, each of which is hereby expressly incorporated by reference herein.

TECHNICAL FIELD

This disclosure relates to conversation management, and more particularly to managing conversations between a customer and a customer contact center.

BACKGROUND

The statements in this section merely provide background information related to the present disclosure and may not constitute prior art.

Customer contact centers are utilized in many different and diverse organizations for exchanging information between the enterprise and the customers. Customer contact centers, e.g., call centers, have emerged as one of the most important and dynamic areas of a successful business strategy. In many enterprises, contact centers represent a main interfacing point between a customer and the enterprise, handling incoming and outgoing calls from and to its customers in support of its operations. For example, telemarketing businesses utilize contact centers to make outgoing calls to market and sell the company's products. Service and products businesses utilize contact centers for a variety of purposes including dispatch of account information to a customer, maintenance of the company's goods or services, and tracking of product shipments by customers. Contact centers are additionally utilized as an effective method for informational collection for pooling and research oriented organizations.

Contact centers are typically used wherever a large number of calls must be handled for some common enterprise. Typically, the calls of the enterprise are routed through the contact center as a means of processing the calls. A contact center will have a telephone system which may be as simple as a small single-line phone, increasing in complexity up to a large multi-node PBX. A contact center preferably includes a computerized system for tracking, logging and recording call details. The contact center may have no operators or agents, or it may have many, depending on call volume and level of customer interaction. One application of a contact center uses automated audio response systems for general predetermined informational exchanges between the customer and the contact center and reserves agents for answering questions the customer may have.

A contact center preferably monitors agent performance in an interaction with a caller to maintain a high level of customer satisfaction and to keep an acceptable call completion rate by each agent. To simplify and add consistency to call handling, agents are often provided with written call scripts to follow during conversations with customers. While such call scripts improve call completion rates and customer satisfaction, they may prove ineffective in the case of a customer who asks questions or otherwise does not allow the agent to follow the prepared script.

Contact centers can utilize automated audio response systems to provide prerecorded audio in response to a customer input. Utilizing automated audio response systems can improve adherence to a call script by forcing selection of only the predetermined prerecorded audio responses. Use of the audio response systems lessens reliance on agent-operators to administer the call script and decreases costs associated with the contact center. However, use of the audio response system can frustrate customers seeking information not available from the call script and decrease customer satisfaction among customers seeking personalized assistance. Accordingly, a need exists for a way of making presentations to the customer that shares the efficiency of an audio response system with the personalization of an agent-operator. This combination enables new levels of automation and customer satisfaction in the customer service center by engaging users in intuitive, intelligent, and constructive interaction, and enabling organizations to increase service efficiency, and reduce call time for customer informational exchanges and transactions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure include processing systems providing a service to an agent-operator. According to at least one embodiment, such systems may include a processor and a memory. Such systems may further be programmed via executable program instruction to perform a method. In at least one embodiment, such methods may include obtaining a plurality of selectable audio responses associated with a call script, where the call script includes a number of segments, and where the segments are associated with the selectable audio responses. A caller may be interacted with, and an audio response selected from among the plurality of selectable audio response may be communicated to the caller together with background sound mixed with the communicated audio response.

Additional embodiments of the present disclosure include methods operational at an agent workstation for managing real-time conversations. In at least one implementation, such methods include interacting with a caller. An audio response selected from among a plurality of selectable audio responses associated with a call script may be communicated to the caller, where the call script includes a number of segments, and where the segments are associated with the selectable audio responses.

In at least one additional implementation, such methods may include communicating with a contact center via a communications device. The contact center may utilize a call script including a number of segments, where the segments are associated with a number of nodes, and where the nodes are associated with a number of prerecorded audio responses. A prerecorded audio response may be received from the contact center, as well as background sound mixed with the prerecorded audio response.

Yet further embodiments of the present disclosure include processor-readable storage mediums storing processor-executable programming. According to at least one embodiment, the processor-executable programming may cause a processing circuit to access a plurality of selectable audio responses associated with a call script, where the call script comprises a number of segments, and where the segments are associated with the selectable audio responses. The processor-executable programming may further cause a processing circuit to communicate to a caller an audio response selected from among the plurality of selectable audio responses, as well as background sound mixed with the communicated audio response.

Other aspects, features, and embodiments associated with the present disclosure will become apparent to those of ordinary skill in the art upon reviewing the following description in conjunction with the accompanying figures.

DRAWINGS

FIG. 1 schematically shows an exemplary contact center management system including a telephony server signally connected to a public communications network, in accordance with the present disclosure.

DETAILED DESCRIPTION

Figure 1:
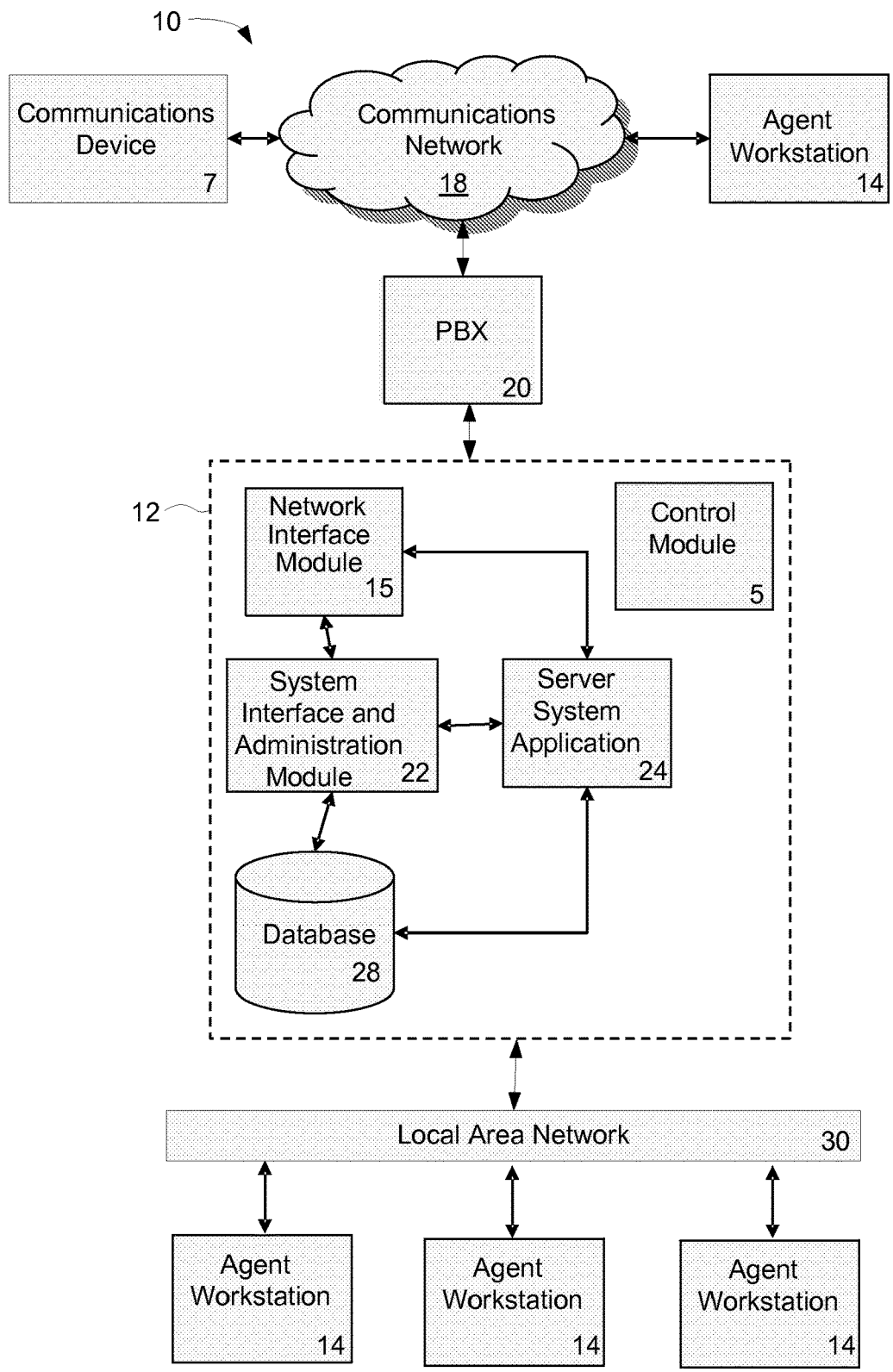

Referring now to the drawings, wherein the depictions are for the purpose of illustrating certain exemplary embodiments only and not for the purpose of limiting the same, FIG. 1 schematically shows a contact center management system 10 including a telephony server 12 signally connected to a public communications network 18 that have been constructed in accordance with an embodiment of the disclosure. The public communications network 18 includes digital and analog communication capabilities for telephony and internet connections, as one skilled in the art will recognize. The telephony server 12 is connected to a telephony switch (PBX) 20 configured to signally connect the telephony server 12 with the public telephony network 18. The public communications network 18 signally connects a caller to the telephony server 12 via the telephony switch 20. The caller may utilize any one of a number of known communication devices 7 to communicate with the telephony server 12 and contact center such as cellular devices, satellite devices, computer-based communication applications, broadband-based devices, and VOIP-based devices. The telephony server 12 is illustrated in FIG. 1 and described herein as including discrete components, however, one skilled in the art will recognize that the functions performed by the telephony server 12 may be implemented in one or more stand-alone devices. For example, the telephony switch 20 is illustrated as a component of the telephony server 12, however, it should be recognized that the functions performed by the telephony switch 20 may be implemented in one or more stand-alone devices signally connected to the telephony server 12.

The telephony server 12 additionally includes a control module 5, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The storage mediums are preferably configured to store, access, and modify structured or unstructured databases for data including, for example, relational data, tabular data, audio/video data, and graphical data. The storage mediums are configured to store, access, and modify a database 28. In one embodiment, the database 28 may be implemented in one or more stand-alone devices such as in a remote and/or separate server system.

The control module 5 is preferably a general-purpose microprocessor or central processing unit and has a set of control algorithms, comprising resident program instructions and calibrations stored in the non-volatile memory and executed to provide the desired functions. As one skilled in the art will recognize, the control module 5 executes functions in accordance with an operating system. The algorithms are preferably executed during preset loop cycles. Algorithms are executed by the central processing unit and are configured to monitor inputs from the telephony switch 20 and the network interface modules 15 and execute control routines to control operation of the telephony switch 20 and the network interface modules 15. Loop cycles may be executed at regular intervals during ongoing operation. Alternatively, algorithms may be executed in response to occurrence of an event. The description of the control module 5 is meant to be illustrative, and not restrictive to the disclosure.

The telephony switch 20 is controllable by the telephony server 12 via a server system application 24 and configured to make, break or change connections between telephone lines in order to establish, terminate, or change a telephone call path. The telephony switch 20 can be a private branch switch and may be one of any number of known switches. The telephony switch 20 is preferably configured to provide network information such as ANI (answer number identification, also known as Caller Line Identification (CLI)) and DNI (dialed number identification). In one embodiment, the telephony switch 20 is configured to perform intelligent dialing functions and to transfer calls as requested by the server system application 24. The telephony switch 20 is illustrated in FIG. 1, and described herein as comprising a discrete element. Such illustration is for ease of description and it should be recognized that the functions performed by the telephony switch 20 may be combined in one or more devices, e.g., implemented in software, hardware, and/or application-specific integrated circuitry. For example, the telephony switch 20 may be implemented as one or more algorithms in the control module 5.

The telephony server 12 additionally includes one of more network interface modules 15 configured to interface between outside telephone or network lines including e.g., E-carrier and/or T-carrier lines, in one embodiment, and the telephony switch 20. Incoming electric signals carried by the E-carrier and/or the T-carrier lines are converted by the network interface modules 15 to a predetermined protocol e.g., TCP/IP, SIP, UDP, RTP for transmission to agent workstations 24, a server system application 24, and the control module 5. Outgoing communications from the telephony server 12 are converted by the network interface modules 15 to a predetermined protocol adaptable for transmission to the communications network 18. Additionally, the telephony server 12 in one embodiment is configured to receive requests for information and transmit information through use of the hypertext transfer protocol (HTTP). In one embodiment, one or more network interface modules are communicatively connected to a LAN 30 to communicate with one of more agent workstations 14.

The telephony server 12 is configured to operate any one of a number of server systems including proprietary and open source system solutions, for example, Apache (Apache Software Foundation; Forest Hill, Md.) or Internet Information Server ("IIS"; Microsoft Corporation; Redmond, Wash.). The telephony server 12 in one example works in cooperation with one or more additional components including a system interface and administration module 22 and a server system application 24. The system interface and administration module 22 may be implemented using a web application framework. Examples of web application frameworks are Ruby on Rails (created by David Heinemeier Hansson; http://www.rubyonrails.org/), ASP.NET (Microsoft Corporation; Redmond, Wash.), Java and J2EE (Sun Microsystems, Inc.; Santa Clara, Calif.), PHP ("PHP: Hypertext Preprocessor", www.php.net), and Django (www.djangoproject.com). In one embodiment, the system interface and administration module 22 is configured to log operational statistics of the telephony switch 20 into the database 28 including, e.g., call duration, receiver connection address, and caller connection address. The system interface and administration module 22 provides administrative access and tools to manage, monitor, and create call scripts. The system interface and administration module 22 is additionally configured to manage predetermined administrative functions of the server system application 24 including, e.g., user accounts and SIP settings. The system interface and administration module 22 also provides a number of reporting tools for monitoring the agent-operators and dialer performance, and access to call scripts.

The server system application 24 manages functional aspects of the telephony server 12 including managing the database 28, managing interactions between the caller, the telephony server 12, and the agent workstations 14, and monitoring and controlling the telephony switch 20. The server system application 24 includes event-based networking control enabling event-driven interactions between the caller, the telephony server 12, and the agent workstations 14. The server system application 24 is configured to manage connections between the telephony server 12 and the agent workstations. The server system application 24 preferably includes an inbound call manager to connect calls to an agent-operator if one is available, and send the call to a voicemail recorder otherwise. The server system application 24 is further configured to communicate with the agent workstations using one or more protocols or processes. In one embodiment, the server system application 24 communicates with the agent workstations using a serialization process, i.e., converting selected objects and types into strings of digital data for reconstituting on the receiving end. The server system application 24 is additionally configured for remote method calls, i.e., affecting a local object to execute a method on an agent workstation. The server system application 24 manages the database 28 including executing reading and writing functions. The server system application 24 and the database 28 may be configured for object-relational mapping in one embodiment. In one embodiment, server system application 24 processes requests from the agent workstations to present a prerecorded response stored on the database 28 to a caller.

Agent-operator workstations 14 are preferably general-purpose digital computers comprising resident program instructions and calibrations stored in the non-volatile memory and executed to provide the respective functions of each computer. In one embodiment, the agent workstations are personal computers equipped with memory, hard drive, input devices including e.g., a keyboard, mouse, microphone, and headphones, in one embodiment, and a visual display unit. Audio channels transmitted to the headphones, in one embodiment, may be agent controlled or software controlled. For example, a first audio channel to the left speaker in the headphones may broadcast audio associated with a first call, while a second audio channel to the right speaker in the headphones may broadcast audio associated with a second call. In this way, the agent may listen to two conversations simultaneously. Additionally, as described herein, in one embodiment the agent may control the audio channels via software options on the workstation. For example, the agent may select which call is transmitted to both speakers of the headphones, while the second call is not transmitted. Audio channels transmitted to the headphones may also be dependent on agent progression through a call script, and/or agent movement from a viewing area to a second viewing area on a graphical user interface. For example, progression to a predetermined segment in a call script may automatically switch one audio feed for another based upon user input position, e.g., mouse pointer position, or other means for indicating an agent's interest in a viewing area to switch audio channels.

The visual display unit may include touch screen capabilities for user input. The workstations may be configured for internet access via the communications network 18, internet service provider, and/or local area network, using a network card e.g., an Ethernet card. The workstations are configured to operate any suitable operating system including proprietary and open source solutions, wherein the operating system is configured to operate a software application for administering a call script as described herein below. As shown in FIG. 1, the agent workstations may be connected to the telephony server 12 via a local area network or connected through the internet using, e.g., the communications network 18. In one embodiment, the agent workstations are configured with a softphone for telephony communications routed through the telephony server 12 using one of multiple protocols including, e.g., SIP. The agent workstations are configured to record and, in one embodiment, store recordings by an agent-operator for subsequent presentation to a caller as described herein below.

Each workstation is equipped with a graphical user interface enabling monitoring and functional control of system operations including access to a call script and associated data and text fields to record information from a caller. Data received from a caller may be stored in the database 28 on the telephony server 12 or stored on the workstation for later upload to the telephony server 12. In one embodiment, the data is collected and recorded according to predetermined template files associated with a call script.

Figure 2:
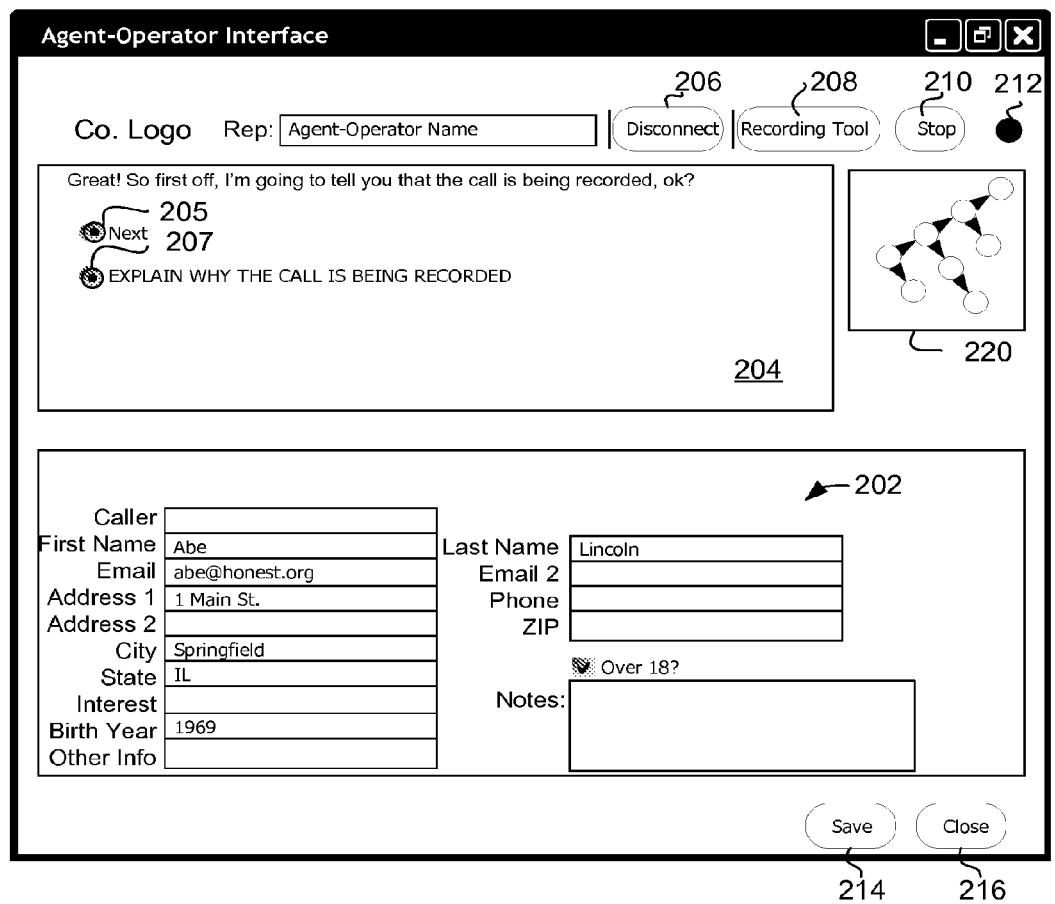
FIG. 2 shows an exemplary embodiment of a graphical user interface for an agent-operator, in accordance with the present disclosure.

FIG. 2 shows an exemplary embodiment of a graphical user interface 200 for an agent-operator. As FIG. 2 shows, the interface 200 maintains a set of data fields 202 and an interactive display 204 for each call the agent-operator is currently assisting. The graphical user interface enables an agent-operator to assist a conversation by selecting a desired field corresponding to the call. As shown in FIG. 2, the agent-operator may select the desired field via an indicated key on a keyboard. Here, selecting a first graphical button 205 will play one prerecorded audio file, selecting a second graphical button 207 will play another. As one skilled in the art will recognize, there are multiple ways for selecting the desired data field such via keystroke utilizing a keyboard. The interface 200 further includes call handling functions such as a disconnect button 206, a recording button 208 with stop 210 and start 212 control. The data fields 202 corresponding to a contact may be configured by an administrator to include or collect different information depending on a particular need of a contact center or a particular call campaign. The interface 200 additionally includes a save button 214 for writing agent-operator collected information associated with a contact to the database 28, and a close button 216 for closing the interface 200. Functions included in the interface 200 may be duplicated for use with multiple contacts simultaneously. For example, the data filed 202, the interactive display 204, disconnect button 206, a recording button 208 with stop 210 and start 212 control may be repeated in another window or within another module within the interface 200 for each additional contact the agent-operator is currently assisting and administering the call script to. In one embodiment, the interface 200 prerecorded audio is represented graphically as a node in a flow chart 220, and an arrow between two nodes represents that one follows the other in the script. In one embodiment, the flow chart 220 is expandable to enable an agent-operator to view data associated with each node. In one embodiment of the interface 200, a button is configured to interrupt an automated mode or an agent assist mode to operate in an agent-operator mode as described herein below. The agent-operator mode permits direct communication from the agent-operator to the caller as described herein below. Alternatively, the button may be replaced or supplemented with a defined keystroke on the keyboard.

In situations requesting the agent-operator's attention, the graphical user interface is configured to present an appropriate signal. For example, an automated voice-recognition algorithm could detect a predetermined abnormality in the conversation. One or many signals may be used to capture an agent-operator's attention, for example, a pop-up window or interface module may be configured to present information to the agent-operator and present a selected course of action such as present a response to a caller. In one embodiment, and for predetermined functions, the graphical user interface may automatically present a message or caller's response requiring action by the agent-operator. If two or more calls need attention, they are prioritized, and if the agent-operator cannot manage these calls simultaneously, the agent indicates this to the graphical user interface through a single key stroke, after which the call is automatically sent to an agent who can manage it at the moment. This option to transfer calls can be performed at any time and even between different physical contact center locations.

Figure 3:
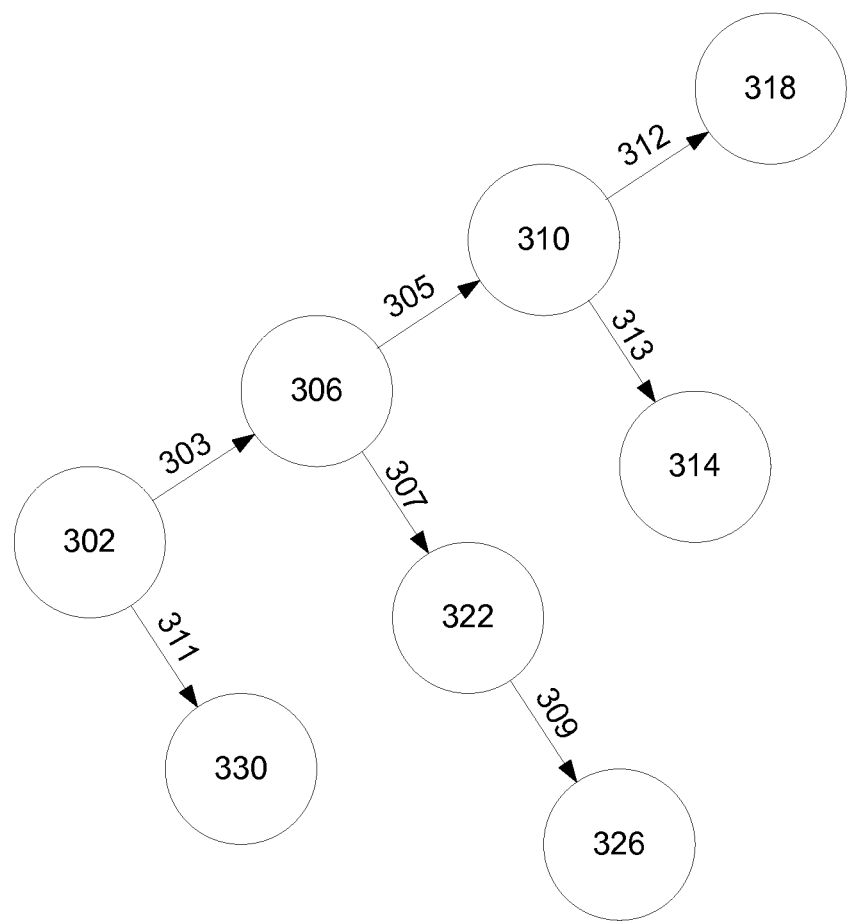
FIG. 3 shows an exemplary state transition graph to illustrate functions of a call script, in accordance with the present disclosure.

FIG. 3 shows an exemplary state transition graph to illustrate functions of a call script. As one skilled in the art will recognize, a call script details a planned dialog for communications or sequences of communications between a caller and the contact center management system 10 or an agent-operator. As FIG. 3 shows, a call script may be modeled as an ordered set of states 302, 306, 310, 314, 318, 322, 326, and 330 and transitions to other states 303, 305, 307, 309, 311, and 313 in which the transition from each state includes a question or statement by the customer and a response by the agent-operator or contact center management system 10 (or in some cases, an action to be taken in response to the question, such as posing a question back to the user). In some implementations, the delimiter for each statement or communication by the caller or response by the agent-operator or contact center management system 10 is a period of silence or a spoken interruption. Certain predetermined states of the call script can be associated with multiple, predetermined states and transitions. In operation, selecting a state to transition to from a set of possible states following the call script is based upon caller input and, in some situations, input from the agent-operator. The state-transitions of a call script may be indexed and cataloged using a predetermined data structure such as an XML document or, in one embodiment, stored and indexed in a database structure such as SQL, for subsequent processing by an agent workstation. Segments of the call script (or states and transitions to states) may be associated with an operating mode such as the automated mode, the agent-operator assist mode, and the agent-operator mode. For example, one segment of the call script may be associated with the automated mode while a second, separate call script segment may be associated with the agent-operator assist mode. As described herein the agent-operator mode may be selected by the agent-operator at any time to permit direct communications from the agent-operator to the caller.

In operation, the call script is utilized by an agent-operator to manage a real-time conversation with a plurality of callers. Before administering the call script to callers, the agent-operator personalizes a number of audio responses associated with the call script in the agent-operator's own voice. The prerecorded audio files are associated with states and/or transitions to other states and may include responses to questions from a caller and/or statements, for example. Personalized statements and responses are prerecorded by the agent-operator in such a manner to enable a subsequent presentation to a caller that emulates a real-time presentation to the caller. In this way, each statement and response presented to the caller simulates a real-time conversation by having a rhythm and cadence of a natural conversation. The recordings may encompass all known states and transitions associated with a call script. In this way, when a statement or response is presented to the caller, the caller is unaware that the presentation was prerecorded. In operation, in one embodiment, the personalized statements and responses are stored on the database 28 for an agent-operator operating a workstation to select for presentation to the caller. Further, the recordings may be supplemented with real-time background sound channeled from the physical location of the agent-operator and presented to the caller in addition to any other communications from the agent-operator. Including the background sound, i.e., ambient noise, enhances the simulation of a real-time presentation to the caller.

Figure 4:
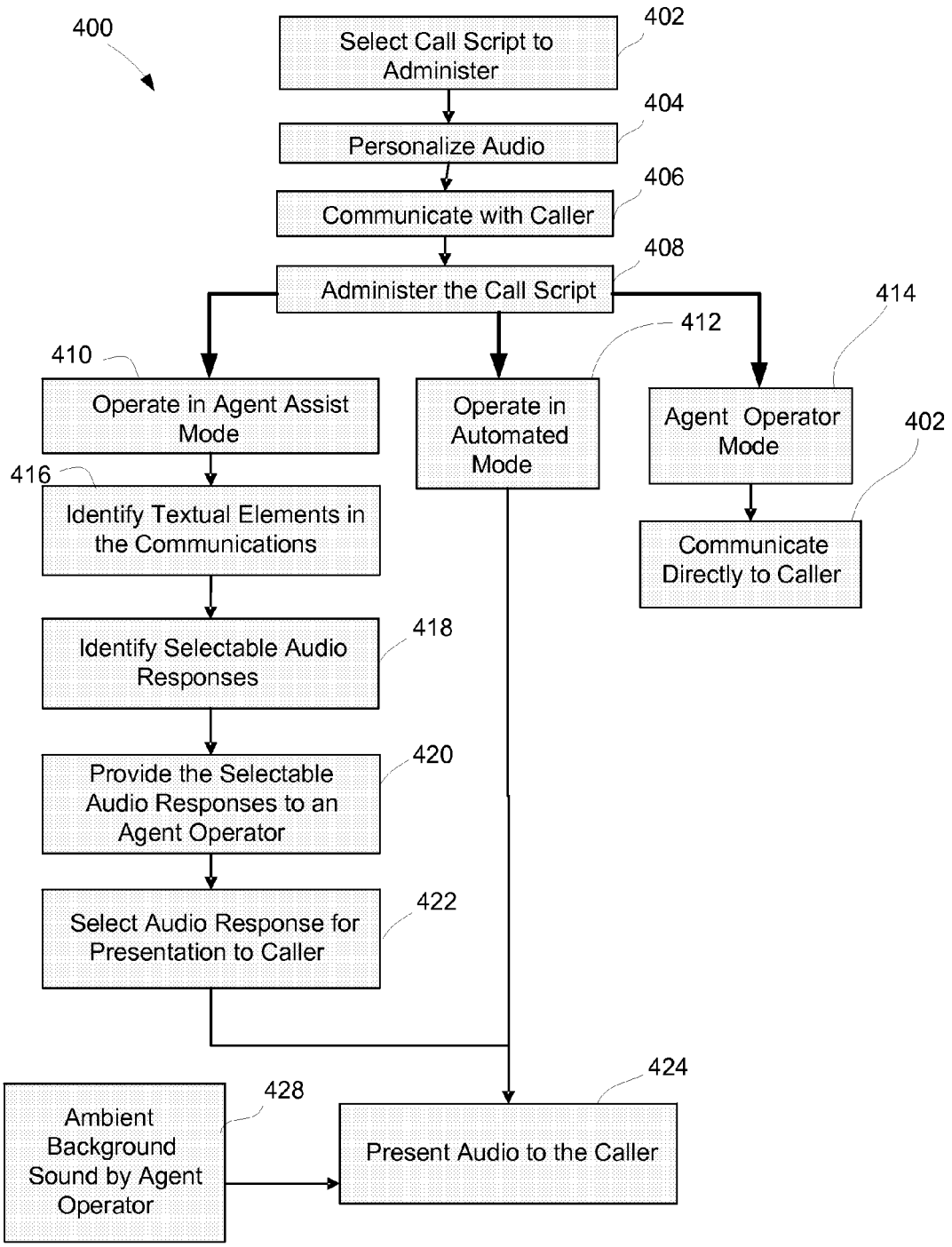
FIG. 4 shows a control scheme for managing a real-time conversation with a caller, in accordance with the present disclosure.

FIG. 4 shows a control scheme 400 for managing a real-time conversation with a caller. Although the control scheme 400 is shown for management of a single real-time conversation, multiple control schemes 400 may be executed in parallel enabling management of multiple real-time conversations simultaneously. The multiple additional control schemes may be initiated irrespective of status of another control scheme. For example, a first control scheme may be receiving a communication while another control scheme is presenting responses to a caller, as described herein below. Although the control scheme 400 is shown as discrete elements in FIG. 4, such an illustration is for ease of description and it should be recognized that the functions performed by the control scheme 400 may be combined in one or more devices, e.g., implemented in software, hardware, and/or application-specific integrated circuitry (ASIC). In the example of the contact center, for example, the control scheme 400 may be implemented in software in each agent workstation. The workstations are configured to permit the agent-operators to guide one or more callers through the call script simultaneously.

Operating the control scheme 400 at a workstation, an agent-operator selects a call script to administer 402. The call script may be stored in the database 28 of the telephony server 12 and downloaded to the workstation of the agent-operator. In one embodiment, a database structure such as SQL is used to store and link to the call script and associated audio recordings. Additionally, a data structure file such as an XML document may contain the call script and links to associated audio recordings. The agent-operator personalizes statements, responses and questions as described herein above 404. In the embodiment of a contact center, the agent-operator may initiate contact with a caller, or the caller may dial into the contact center to communicate with the agent-operator. In operation, the agent workstations receive one or more communications from one or more callers 406. The agent-operator administers the call script to the caller 408.

The control scheme 400 is configured, in one exemplary implementation, to provide three types or levels of conversation management and the system may switch between these during a given conversation according to traversals between transition-states of the call script. Using an automated mode 412, the system engages the caller automatically exchanging information independent of an agent-operator. The automated mode 412 may be engaged by transitioning to a segment of the call script associated with the automated mode. Using an agent assist mode 410, the system involves an agent-operator by presenting him with the caller communication and a number of suggested responses. The agent-operator selects one of the suggested responses for presentation to the caller. The agent-operator can also search the system knowledge base for an alternative response by entering a question into the system. In the agent assist mode, the agent does not pick up the call or interact directly with the caller, but nevertheless the caller is engaged in a simulated real-time, synchronous communication with the agent-operator through use of prerecorded responses. Using an agent assist mode, an agent-operator engages in direct real-time communication with the caller.

During operation, the agent-operator controls interactions and manages the flow of dialog 409 between the caller and the contact center management system 10. During predetermined segments of the call script agent-operators operating the workstations guide callers enabling an informational exchange between the caller and the contact center management system 10.

While operating in the agent assist mode 410, for example during a predetermined segment of the call script, an agent-operator guides the caller through the call script by selecting statements and responses for presentation to the caller. Predetermined segments of the call script can be associated with certain predetermined states of the call script that are associated with multiple, predetermined states and transitions. These states are preferably associated with the agent assist mode. The control scheme 400 identifies textual elements in the caller's communication 416. The control scheme 400 identifies predetermined keywords spoken by the caller corresponding to key concepts as described herein below, preferably defined and indexed in the data structure file e.g., an XML file. The key concepts are used to determine a predetermined number of selectable audio responses based upon a call script, predetermined criteria, and a confidence metric 418. In one embodiment, the suggested responses and/or statements are ranked based upon a confidence value. The confidence value is a metric quantifying a probability that a particular suggested response will transmit relevant information in response to the key concept communicated by the caller and concurrently advance the call script towards completion. In one embodiment, the threshold of confidence in interpreting the customer's communication may be adjusted based on how busy the agent-operators are with another call.

Analyzing a caller's prior statements and responses to determine a set of suggested responses and/or statements for presentation can be accomplished using one of multiple methods. One method includes analyzing the caller's communications using a concept recognition engine configured with, in one embodiment, a speech recognition algorithm. The speech recognition algorithm converts spoken conversation from the caller into text that becomes input to the concept recognition engine. The concept recognition engine analyzes the text to identify key concepts and/or expressions from the communications in real-time, independent of the literal wording. By integrating the concept recognition engine with speech recognition, the underlying system recognizes what the customer says by conceptually understanding what the customer means. The concept recognition engine may be supplemented by additional text supplied by an agent-operator monitoring the text identified by the speech recognition technology to better identify a concept being communicated by the caller. The key concepts may be predetermined or may be dynamically identified based upon historical conversations. The key concepts may be identified using a library of text elements and associated meaning in terms of a set of semantic factors. In this way, concepts from incomplete or inarticulate communications may be matched to a key concept. Higher level organizations of the concepts into various structures reflecting syntax or nearness is also possible. Key concepts identified by the concept recognition engine enable the formation of appropriate responses as described herein below.

Responses from a caller including keywords and text elements are collected and recorded using input from the speech recognition algorithm, concept recognition engine, and/or input from the agent-operator. The responses are preferably indexed according to a predetermined data structure associated with states of the call script. In one embodiment, a predetermined XML file associated with a call script may be used to catalog caller's responses.

After identifying a key concept, a set of suggested responses is determined based upon the current state in the call script, associated states and transitions, and confidence values corresponding to the associated states and transitions. Each suggested response corresponds to a confidence value greater than a predetermined threshold.

Determining the confidence value may be accomplished using one of multiple methods. A first method is based upon an association between a key concept communicated by the caller and predetermined key words associated with a potential transition-state of the call script. As described hereinabove, the key concepts are associated with a library of text elements. Potential transition-states are associated with a set of keywords and text elements. The greater the number of text elements included in both the library associated with the key concept and included in a set of key words and text elements associated with a transition-state, the greater the confidence value. Keywords and text elements may be weighted in some embodiments wherein association between certain words or text elements results in a greater confidence value than association between other words or text elements. Historical communication logs between callers and the contact center management system 10 may be used to weigh different words and text elements and/or identify additional words and text elements used to determine the confidence value based upon correlation between the word and text elements and a key concept.

In operation, confidence values are determined for each transition-state linked to the current state with respect to the call script. Transition-states corresponding to confidence value greater than a predetermined threshold are provided to the human-agent for selection and subsequent presentation to the caller. If the caller's communication is matched with responses associated with a low confidence value, the agent-operator may decide to rephrase or supplement the customer's key concept with substitute text that may result in responses associated with a greater confidence value.

The selectable audio responses are provided to the agent-operator operating the workstation 420. The agent-operator selects an appropriate audio response 422 for real-time presentation to the caller 424.

During administration of the call script, the agent-operator and caller proceed from one transition-state to another. This traversal of a sequence of states and transitions may continue until either the customer terminates the conversation or the call script reaches an end state. However, errors in the text received by the concept recognition engine and non-standard (or unexpected) questions or statements by the caller may require intervention by an agent-operator. For example, when the speech recognition algorithm is unable to convert the caller's communication. Due to the possibility of such errors, and when no appropriate selection may be made, the agent-operator may interject or manually intervene into the phone communication and personally respond to the communication by transitioning to the agent-operator mode 414 to communicate directly to the caller 426. When the agent-operator interjects in real-time in the phone communication to respond to the caller, the caller is unaware of the transition from presenting prerecorded responses to presenting a real-time agent-operator's voice. The transition from presenting recordings to direct communication in real-time is made seamless by implementing the personalized responses described herein above. Transition to the agent-operator mode can be executed by the agent-operator in a number of ways. For example, a single keystroke that halts recording playback and unmutes the agent's microphone may be utilized in one embodiment. In one embodiment, an agent-operator can resume the agent assist mode or automated mode by selecting call a node in the graphical representation of the script on the interface 200.

Additionally, in order to make the conversation more natural, there are a number of recordings that an agent can chose to interject at anytime during the phone call. These prerecorded audio file are preferably indexed in an XML file and associated with a key, although the prerecorded audio files may be indexed and stored in a database structure as described herein above. These recordings are more generic in nature and can be associated with many different calling campaigns.

As an example, during an exemplary call to the contact center management system 10 executing an exemplary call script, the caller interacts with the contact center management system 10 by providing information and receiving information based upon a predetermined call script. Statements and responses are personalized and presented in the voice of the agent-operator. When the caller advances to the predetermined segment scripted for administration by the agent-operator, the agent-operator selects suggested responses and/or statements to the caller for presentation from the telephony server 12 and incorporate background noise from the physical location of the agent-operator operating the workstation. When the suggested responses are associated with a confidence value less than a predetermined threshold, the agent-operator may search a system knowledge base for an alternative response by entering keywords and/or directing the system to provide an appropriate response. When the caller advances to the predetermined segment scripted for administration by the agent-operator, the statements and responses are presented in the personalized voice of the agent-operator. Upon completion of the call script or termination of the call by the caller, the call ends without the caller knowing that an agent-operator selected any of the responses presented.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A processing system that provides a service to an agent-operator, said system comprising a processor and a memory, and being programmed, via executable program instructions, to perform a method that comprises:
   obtaining a plurality of selectable prerecorded audio responses associated with a call script, wherein the call script comprises a number of segments, the segments associated with the selectable prerecorded audio responses;
   interacting with a caller;
   communicating to the caller a prerecorded audio response provided from a database, wherein the communicated prerecorded audio response is selected from among the plurality of selectable prerecorded audio responses; and
   communicating to the caller live ambient background noise channeled from a workplace associated with the agent-operator, wherein the live ambient background noise channeled from the workplace associated with the agent-operator is mixed with the communicated prerecorded audio response provided from the database.

2. The processing system of claim 1, wherein the method further comprises:
   selecting a mode of interaction with the caller from among an automated mode, an agent-operator assist mode, and an agent-operator mode.

3. A method operational at an agent workstation for managing a real-time conversation, comprising:
   interacting with a caller;
   communicating to the caller a prerecorded audio response provided from a database, wherein the communicated prerecorded audio response is selected from among a plurality of selectable prerecorded audio responses associated with a call script, wherein the call script comprises a number of segments, the segments associated with the selectable prerecorded audio responses; and
   communicating to the caller live ambient background noise channeled from a workplace associated with the agent-operator, wherein the live ambient background noise channeled from the workplace associated with the agent-operator is mixed with the communicated prerecorded audio response provided from the database.

4. The method of claim 3, further comprising:
selecting a mode of interaction with the caller from among an automated mode, an agent-operator assist mode, and an agent-operator mode.

5. A non-transitory processor-readable storage medium storing processor-executable programming for causing a processing circuit to:
obtain a plurality of selectable prerecorded audio responses associated with a call script, wherein the call script comprises a number of segments, the segments associated with the selectable prerecorded audio responses;
communicate to a caller a prerecorded audio response provided from a database, wherein the communicated prerecorded audio response is selected from among the plurality of selectable prerecorded audio responses; and
communicate to the caller live ambient background noise channeled from a workplace associated with the agent-operator, wherein the live ambient background noise channeled from the workplace associated with the agent-operator is mixed with the communicated prerecorded audio response provided from the database.

6. The processor-readable storage medium of claim 5, further comprising processor-executable programming for causing a processing circuit to:
select a mode of interaction with the caller from among an automated mode, an agent-operator assist mode, and an agent-operator mode.

7. A method for interacting with a contact center, the method comprising:
communicating with the contact center via a communications device, the contact center utilizing a call script comprising a number of segments, the segments associated with a number of nodes, the nodes associated with a number of prerecorded audio responses;
receiving via the communications device a prerecorded audio response played from a database of the contact center; and
receiving via the communications device live ambient background noise channeled from a workplace associated with the contact center, wherein the live ambient background noise channeled from the workplace associated with the agent-operator is mixed by the contact center with the prerecorded audio response provided from the database of the contact center.

* * * * *